United States Patent
Nemati et al.

(10) Patent No.: US 12,487,882 B2
(45) Date of Patent: Dec. 2, 2025

(54) SYSTEM AND METHOD FOR PROTECTING DATA USING CYCLIC PROPERTIES OF ERROR CORRECTING CODE

(71) Applicant: Microsoft Technology Licensing, LLC, Redmond, WA (US)

(72) Inventors: Majid Anaraki Nemati, San Diego, CA (US); Terry M. Grunzke, Boise, ID (US); Brett K. Dodds, Boise, ID (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/530,955

(22) Filed: Dec. 6, 2023

(65) Prior Publication Data

US 2025/0110824 A1   Apr. 3, 2025

Related U.S. Application Data

(60) Provisional application No. 63/587,029, filed on Sep. 29, 2023.

(51) Int. Cl.
*G06F 11/10* (2006.01)
*G06F 5/01* (2006.01)

(52) U.S. Cl.
CPC .......... *G06F 11/1004* (2013.01); *G06F 5/01* (2013.01); *G06F 11/1068* (2013.01)

(58) Field of Classification Search
None
See application file for complete search history.

(56) References Cited

U.S. PATENT DOCUMENTS

| | | | | |
|---|---|---|---|---|
| 9,128,858 | B1 * | 9/2015 | Micheloni | H03M 13/3707 |
| 10,236,915 | B2 * | 3/2019 | Graumann | G06F 11/1068 |
| 10,312,944 | B2 * | 6/2019 | Khayat | H03M 13/2948 |
| 2004/0088636 | A1 * | 5/2004 | Cypher | G06F 13/1668 |
| | | | | 714/E11.049 |
| 2016/0156372 | A1 * | 6/2016 | Motwani | G06F 11/1068 |
| | | | | 714/755 |
| 2017/0373703 | A1 * | 12/2017 | Wu | H03M 13/2906 |
| 2018/0011762 | A1 | 1/2018 | Klein | |
| 2020/0004627 | A1 * | 1/2020 | Sharon | G06F 3/064 |

OTHER PUBLICATIONS

International Search Report and Written Opinion received for PCT Application No. PCT/US2024/042601, Dec. 13, 2024, 13 pages.

* cited by examiner

*Primary Examiner* — Daniel F. McMahon

(57) ABSTRACT

A method, computer program product, and computing system for generating first encoded data by performing a first encoding of data included within each of a plurality of memory dies of a memory module using an exclusive-or (XOR) encoding process. Second encoded data is generated by performing a second encoding of the data included within each of the plurality of memory dies of the memory module and the first encoded data using a cyclic code encoding process. Error correction is performed on the data included within each of the plurality of memory dies of the memory module using the first encoded data, the second encoded data, an XOR decoding process, and a cyclic code error correction process.

20 Claims, 18 Drawing Sheets

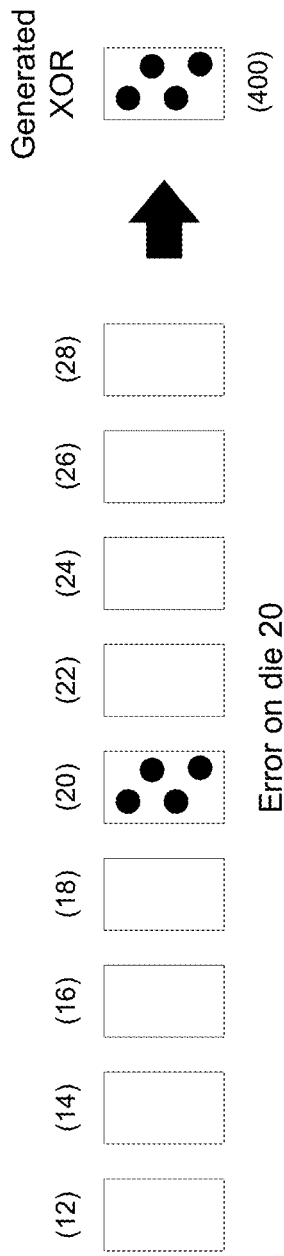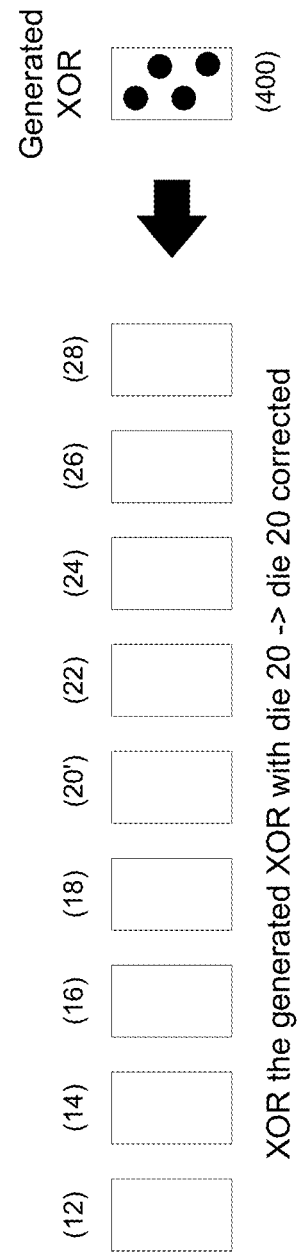

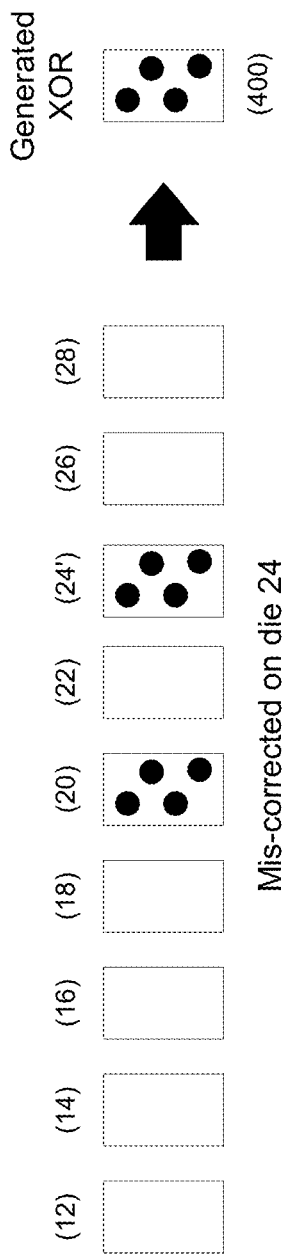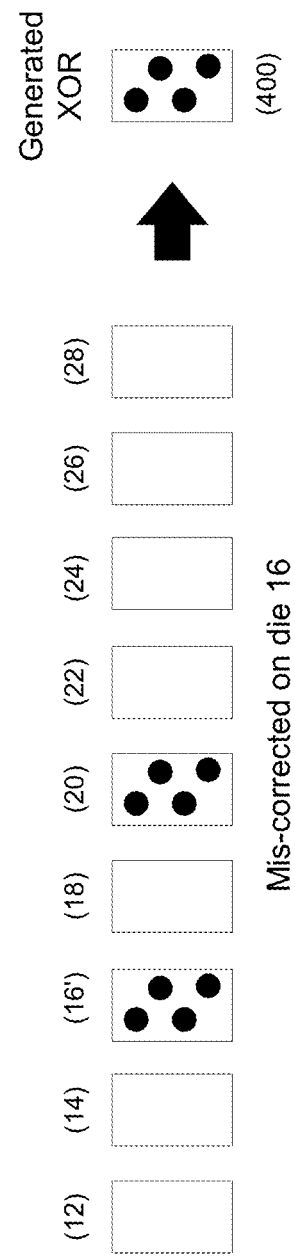

SYSTEM AND METHOD FOR PROTECTING DATA USING CYCLIC PROPERTIES OF ERROR CORRECTING CODE

RELATED APPLICATION(S)

This application claims the benefit of U.S. Provisional Application No. 63/587,029, filed on 29 Sep. 2023, the entire contents of which is incorporated herein by reference.

TECHNICAL FIELD

This disclosure relates to systems and methods for protecting data and, more particularly, to systems and methods for protecting data and metadata within Double Data Rate 5 (DDR5) and Double Data Rate 6 (DDR6) memory and other types of memories (e.g., Low-Power Double Data Rate (LPDDR), Graphics DDR (GDDR), High Bandwidth Memory (HBM), etc.).

BACKGROUND

Memory vendors usually use some capacity in the memory (for example Double Data Rate 5 (DDR5)) to do an on-die ECC (often on-die Single Error Correction, i.e., on-die SEC) to correct errors happening in the memory. SEC can correct a single error on a cache line data coming from a single die. SEC often works on 64 or 128 bits of data. When there is more than one single error on a die, depending on the number of errors, SEC may add additional error (mis-correct), or it may mis-detect the error and assume the data does not have any error. At the host level, there is a separate error correction code (ECC), often in the form of Reed-Solomon (RS).

When additional metadata needs to be stored on die, it reduces the number of available parity bits and therefore, the detection and correction capability of the ECC is weakened.

BRIEF DESCRIPTION OF THE DRAWINGS

FIGS. 8-18 are diagrammatic views of the error correction of a DDR6 memory according to an example implementation of the data protection process of FIG. 2.

Like reference symbols in the various drawings indicate like elements.

DETAILED DESCRIPTION OF THE PREFERRED EMBODIMENTS

As will be discussed below in greater detail, implementations of the present disclosure are configured to combine the on-die ECC bits with the host ECC and using a different ECC scheme in the host level to make more efficient error protection and increase the reliability. As will be discussed in greater detail below, a host uses XOR and the available on-die ECC bits for Bose-Chaudhuri-Hocquenghem (BCH) codes and cyclic redundancy check (CRC) codes to protect the data and metadata. There are significant benefits for the host using existing on-die ECC bits. For example, implementations of the present disclosure use multilayer coding to protect data in DDR5/DDR6 when additional metadata should also be protected. This can be used for different DDR configurations, e.g., 10×4, 5×8, 9×4 and equivalent configurations. Implementations of the present disclosure provide protection against single bit random errors (SBs), die failure (chip kill), and simultaneous die failure and SB. With current methods, configurations like 9×4 do not provide chip kill protection even without additional metadata.

By contrast, the present disclosure uses bits that are used by memory vendors for on-die SEC (single error correction ECC) more efficiently. For example, it provides protection against simultaneous die failure and random error on a separate die using a combination of XOR encoding and cyclic code encoding, while also assigning part of the available bits for additional (protected) metadata. The exact setting of XOR, BCH, and CRC depends on the DDR configurations which will be discussed below. As such, there are configurations where the current methods of on-die SEC and host ECC do not provide protection at the level of die failure, while implementations of the present disclosure provide chip kill protection and protection for additional metadata bits for those same configurations.

The details of one or more implementations are set forth in the accompanying drawings and the description below. Other features and advantages will become apparent from the description, the drawings, and the claims.

Figure 1:
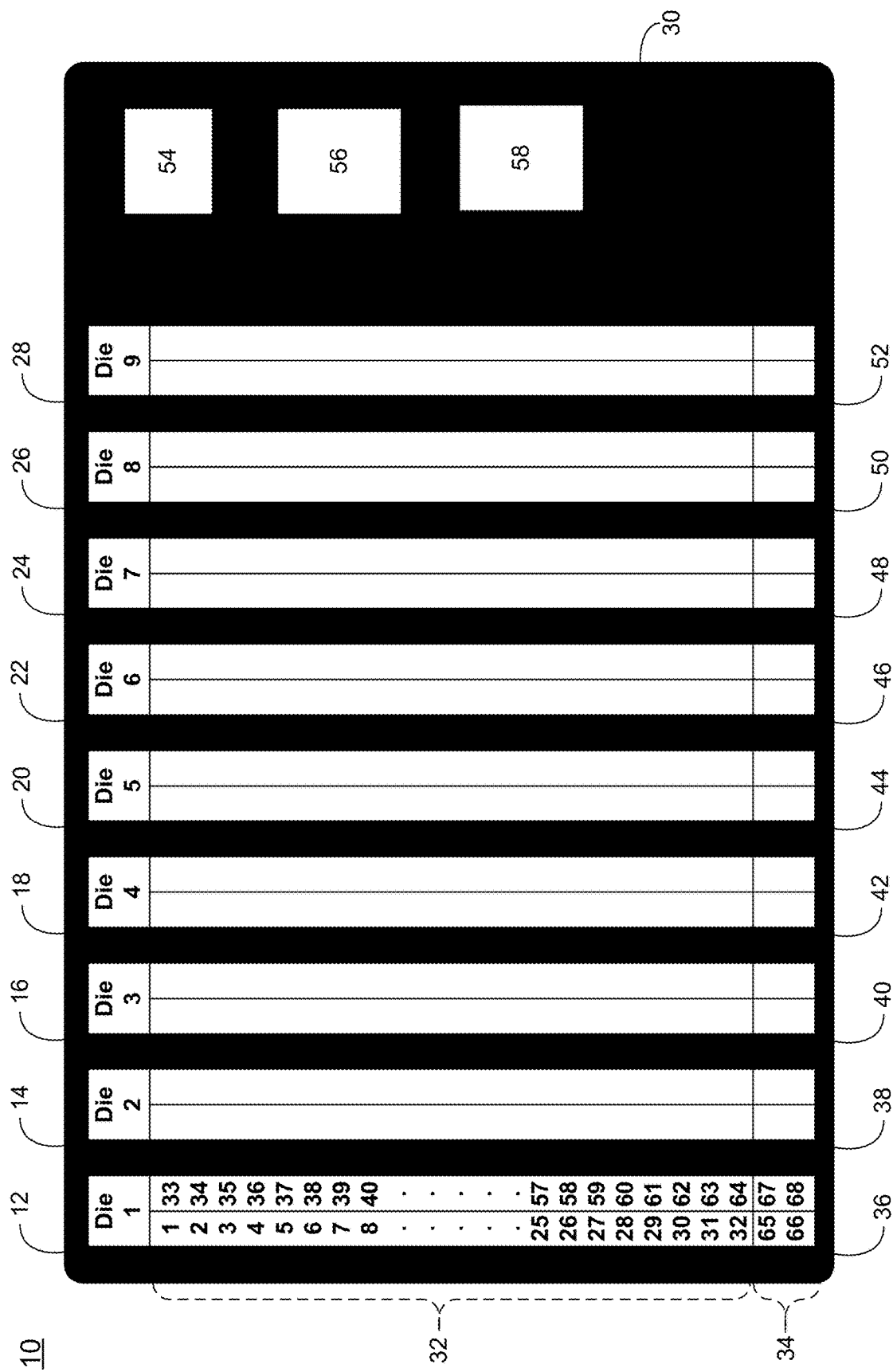
FIG. 1 is a diagrammatic view of DDR6 memory.

DDR5/DDR6 Memory:

Referring to FIG. 1, there is shown DDR6 memory module 10. DDR6 memory module 10 (also known as Double Data Rate 6) is a type of computer memory technology that is used in high-performance computing systems, including desktop computers, server computers, and graphics cards. DDR6 memory module 10 is the successor to DDR5 and offers increased data transfer rates, higher capacities, and improved power efficiency compared to its predecessors. One of the key features of DDR6 memory module 10 is its higher data transfer rates. DDR6 memory modules may achieve speeds much faster than DDR5 transfer speeds. For example, DDR5 has transfer speeds of up to 6400-9600 MT/s (mega-transfers per second). The transfer speeds of DDR6 (while still in flux) may be >17,600 MT/s (mega-transfers per second), which is significantly faster than DDR5 memory. The increased data transfer rates of DDR6 memory allow for faster data access and improved overall system performance. Another advantage of DDR6 memory module 10 is its higher capacity. DDR6 memory can offer higher capacity options compared to DDR5, with likely capacities up to 64 Gb per die, while DDR5 memory currently has capacities up to 32 Gb per die. This allows for larger memory configurations in high-end systems, which can be beneficial for tasks that require a large amount of memory, such as gaming, content creation, and data-intensive applications. Further, DDR6 memory module 10 also incorporates improved power efficiency features, such as lower operating voltages and improved power management techniques. This can help reduce power consumption and heat generation, making DDR6 memory more energy-efficient compared to previous generations of DDR memory. Additionally, other benefits and advantages of DDR6 memory may be realized as the design of the same is refined and finalized. While the examples of DDR5 and DDR6 are used throughout the present disclosure, it will be appreciated that data protection process 10 is applicable to other memory configurations (e.g., Low-Power Double Data Rate (LPDDR), Graphics DDR (GDDR), High Bandwidth Memory (HBM), etc.).

In some implementations, memory module 10 includes nine dies (e.g., dies 12, 14, 16, 18, 20, 22, 24, 26, 28). For example, these ten dies (e.g., dies 12, 14, 16, 18, 20, 22, 24, 26, 28) may be ten dies per rank per sub-channel. In the context of DDR memory module 10, a "die" refers to a discrete silicon chip that is part of DDR memory module 10. DDR memory modules are typically constructed using multiple memory dies (e.g., dies 12, 14, 16, 18, 20, 22, 24, 26, 28) that are integrated onto a single circuit board (e.g., circuit board 32).

A memory die contains the memory cells, sense amplifiers, and other necessary components that enable data storage and retrieval. Each die (e.g., dies 12, 14, 16, 18, 20, 22, 24, 26, 28) is organized into multiple banks, which are further divided into rows and columns of memory cells. The memory cells store binary data in the form of electrical charges, which are read and written using the sense amplifiers and other circuitry on the die.

Memory dies (e.g., dies 12, 14, 16, 18, 20, 22, 24, 26, 28) in DDR memory modules are typically manufactured using advanced semiconductor fabrication processes, which involve the deposition and patterning of multiple layers of materials on a silicon substrate. These processes allow for the miniaturization of the memory cells and other components, which in turn enables higher memory capacities, faster data transfer rates, and improved power efficiency.

Multiple memory dies (e.g., dies 12, 14, 16, 18, 20, 22, 24, 26, 28) are typically used in a single DDR memory module (e.g., DDR memory module 10) to achieve higher overall memory capacity. These dies (e.g., dies 12, 14, 16, 18, 20, 22, 24, 26, 28) are often connected in parallel and controlled by a memory controller (not shown), which coordinates their operations and manages the flow of data between DDR6 memory module 10 and the rest of the system (not shown). This memory controller (not shown) may be a portion of a CPU (not shown) or an off-module device, such as a CXL controller (not shown). The number of memory dies (e.g., dies 12, 14, 16, 18, 20, 22, 24, 26, 28) in a DDR memory module (e.g., DDR memory module 10) depends on the desired capacity and performance characteristics of the module.

As discussed above, each of the nine dies (e.g., dies 12, 14, 16, 18, 20, 22, 24, 26, 28) included within DDR memory module 10 includes sixty-four data storage bits (e.g., data storage bits 34) and four additional bits (e.g., bits 36) that might be used for metadata or protection.

In some implementations, memory module 10 is configurable in DDR5 or DDR6 where the configuration is represented as DDR5 (A×B) or DDR6 (A×B×C), where "A" represents a number of DRAM chips or dies per sub-channel; "B" represents the number of bits per die per sub-channel; and "C" represents a number of sub-channels per die. For example, a DDR6 (10×2×2) has 10 DRAM chips, a total of ×4 IO, in a 2p2 configuration. In another example, a DDR6 (9×2×2) has 9 DRAM chips, a total of ×4 IO, in a 2p2 configuration and DDR5 (9×4) has 9 DRAM chips with a total of ×4 IO.

Figure 2:
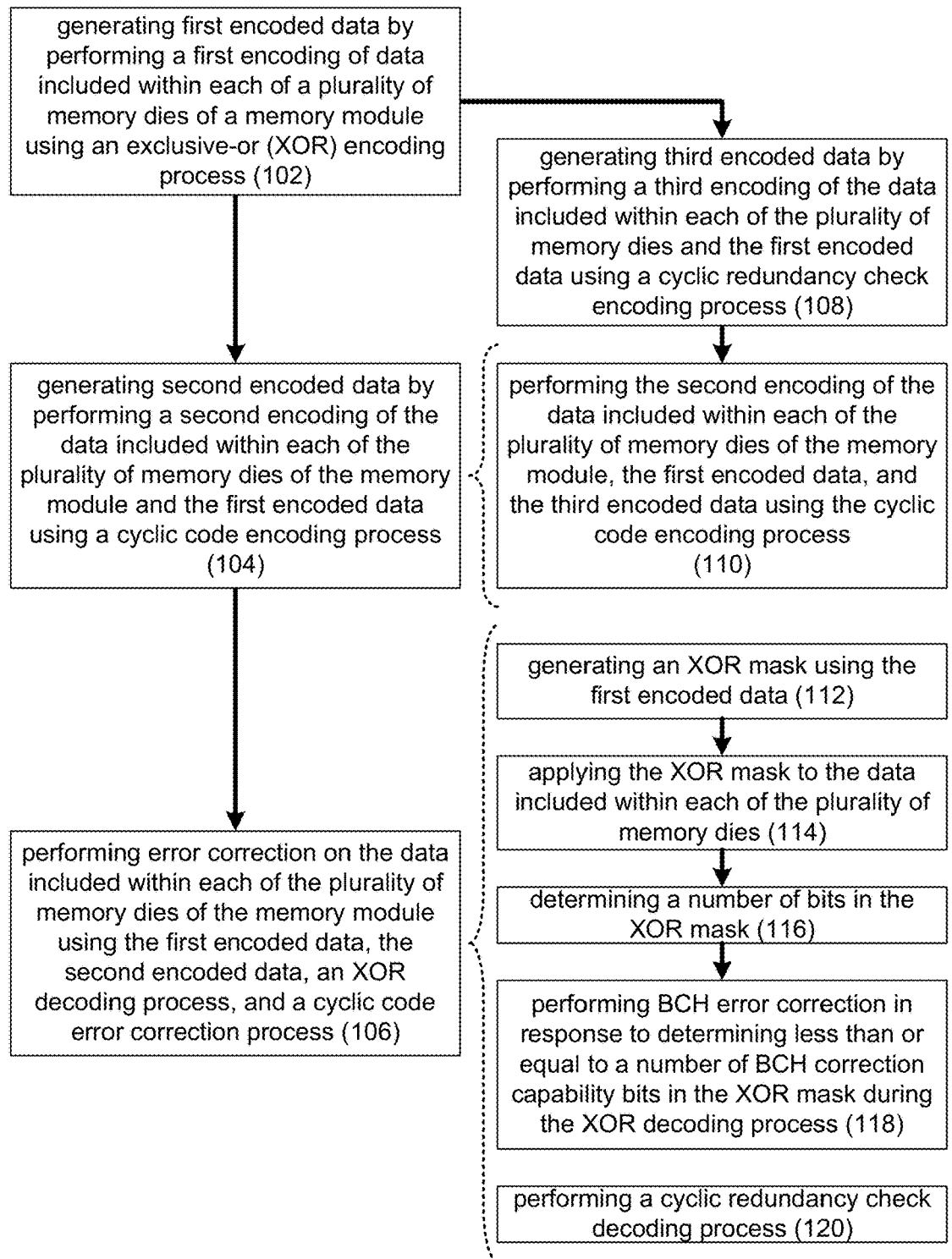
FIG. 2 is a flow chart of one implementation of a data protection process according to an embodiment of the present disclosure.
Figure 3:
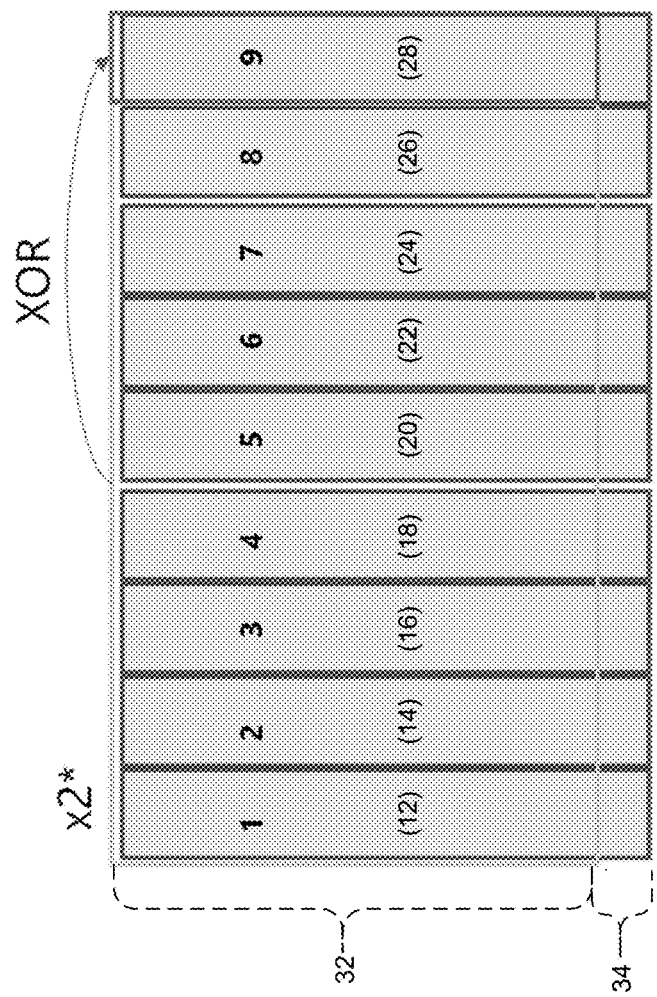
FIGS. 3-7 are diagrammatic views of the encoding of a DDR6 memory according to an example implementation of the data protection process of FIG. 2.

Data Protection Process:

Referring also to FIGS. 2-3, data protection process 100 performs 102 a first encoding of data included within each of a plurality of memory dies of a memory module using an exclusive-or (XOR) encoding process, thus defining first encoded data. A second encoding of the data included within each of the plurality of memory dies of the memory module and the first encoded data using a cyclic code encoding process is performed 104, thus defining second encoded data. Error correction is performed 106 on the data included within each of the plurality of memory dies of the memory module using the first encoded data, the second encoded data, an XOR decoding process, and a cyclic code error correction process by cyclically shifting an XOR mask to generate a rotated version of an aliased codeword to determine the aliased codeword from a correct codeword.

Memory vendors usually use some capacity in the memory (for example DDR5) to do an on-die ECC (often on-die Single Error Correction, i.e., on-die SEC) to correct errors happening in the memory. SEC can correct a single error on a cache line data coming from a single die. SEC often works on 64 or 128 bits of data. When there is more than one single error on a die, depending on the number of errors, SEC may add additional error (mis-correct), or it may mis-detect the error and assume the data does not have any error. At the host level, there is a separate error correction code (ECC), often in the form of Reed-Solomon (RS).

When additional metadata needs to be stored on die, it reduces the number of available parity bits and therefore, the detection and correction capability of the ECC will be weakened.

Implementations of the present disclosure combine the on-die ECC bits with the host ECC and use a different ECC scheme in the host level to provide more efficient error protection and to increase the reliability of data access. As will be discussed in greater detail below, a host uses XOR and the available on-die ECC bits for BCH and CRC codes to protect the data and metadata. For example, by using an XOR encoding process and on-die ECC bits (or ECC bits in other dedicated locations) for a cyclic code encoding process (e.g., BCH and/or CRC), data protection process 100 provides different memory configurations with enhanced failure protections (e.g., such as anti-aliasing by cyclically shifting an XOR mask to generate a rotated version of an aliased codeword of a cyclic code encoding process to determine the aliased codeword from a correct codeword). The following memory configurations are provided as reference. Implementations of the present disclosure achieve:

- 9×2×2 (DDR6) or 9×4 (DDR5) with chipkill (or 2 die with SBs) and 4 bits metadata-Only 12.5% ECC overhead vs. 25% on DDR5 10×4.
- 5×4×2 (DDR6) or 5×8 (DDR5) with chipkill (or 2 die with SBs) and up to 8 bits metadata—Can support 2p4 (×8) devices with chipkill.
- 5×4×1 (DDR6) with chipkill (or 2 die with SBs) and up to 8 bits metadata—Can support ×4 devices without 2p2 downsides.
- 10×2×2 (DDR6) or 10×4 (DDR5) with chipkill and multibit and 4 bits metadata.

Encoding:

In some implementations, data protection process 100 generates 102 first encoded data by performing a first encoding of data included within each of a plurality of memory dies of a memory module using an exclusive-or (XOR) encoding process. An XOR encoding process, or exclusive disjunction or exclusive alternation, is a logical operation that is true if and only if its arguments differ. For example, data protection process 100 compares each bit of its first operand to the corresponding bit of its second operand. If the bit in one of the operands is "0" and the bit in the other operand is "1", the corresponding result bit is set to "1". Otherwise, the corresponding result bit is set to "0". Referring also to FIG. 3, a DDR (9×2×2) configuration for memory module 10 is shown with nine dies (e.g., dies 12, 14, 16, 18, 20, 22, 24, 26, 28). In this example, data protection process 100 generates 102 first encoded data from dies 12, 14, 16, 18, 20, 22, 24, 26 by performing an XOR encoding process on each set of corresponding bits in each die. For example, data protection process 100 performs a first encoding of the first bit from each of dies 12, 14, 16, 18, 20, 22, 24, 26 to generate the first bit of die 28. This first encoding is repeated for each bit of dies 12, 14, 16, 18, 20, 22, 24, 26 until each corresponding set of bits is encoded in die 28. The bits stored in die 28 represent first encoded data for the data in dies 12, 14, 16, 18, 20, 22, 24, 26.

Figure 4:
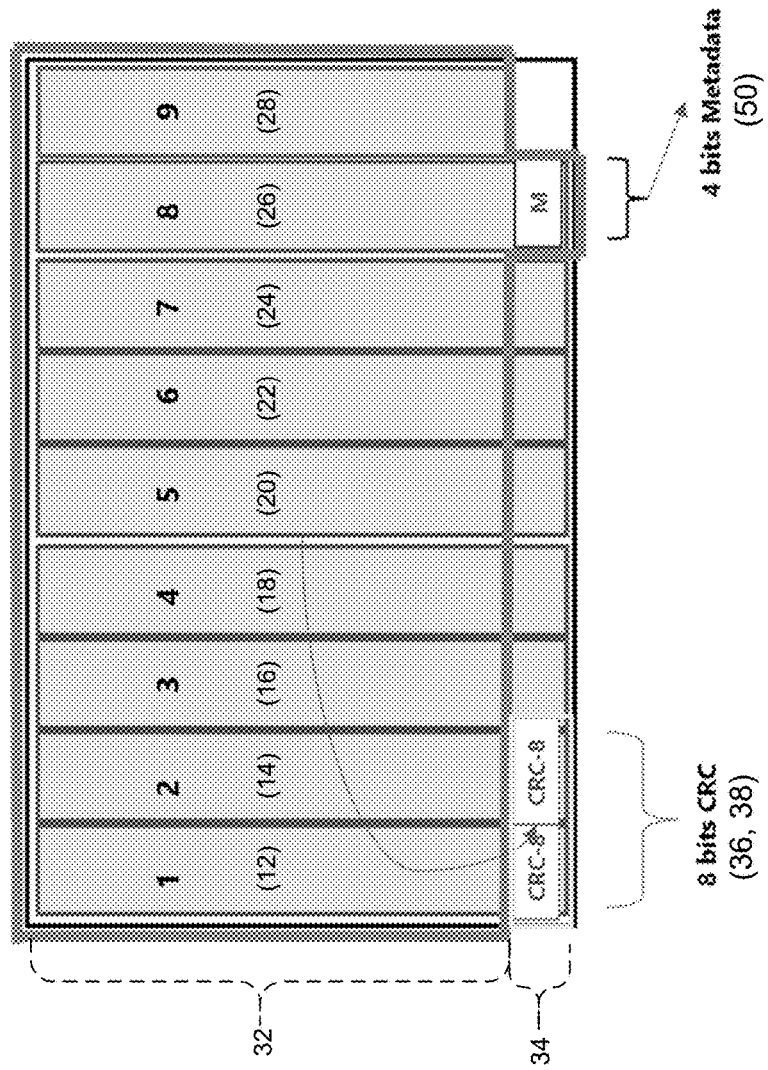

In some implementations, data protection process 100 generates third encoded data by performing 108 a third encoding of the data included within each of the plurality of memory dies and the first encoded data using a cyclic redundancy check encoding process. A cyclic redundancy check encoding process is an error-detecting code commonly used in digital networks and storage devices to detect accidental changes to digital data. Blocks of data entering these systems get a short check value attached, based on the remainder of a polynomial division of their contents. On retrieval, the calculation is repeated and, in the event the check values do not match, corrective action can be taken against data corruption. Referring also to FIG. 4 and continuing with the example configuration from FIG. 3, data protection process 100 generates third encoded data from dies 12, 14, 16, 18, 20, 22, 24, 26, 28 by encoding the cyclic redundancy check on the 512 bits from dies 12, 14, 16, 18, 20, 22, 24, 26; the 64 bits from die 28; and four bits of metadata (e.g., bits 50 from die 26). For example, data protection process 100 performs cyclic redundance check by calculating a short, fixed-length binary sequence, known as the check value or CRC, for the 512 bits from dies 12, 14, 16, 18, 20, 22, 24, 26; the 64 bits from die 28; and four bits of metadata (e.g., bits 50 from die 26), forming a codeword. The resulting codeword is stored in eight additional bits provided by reading out on-die ECC bits (e.g., bits 36, 38) and represent third encoded data for the data in dies 12, 14, 16, 18, 20, 22, 24, 26, 28.

In some implementations, data protection process 100 generates 104 second encoded data by generating 110 a second encoding of the data included within each of the plurality of memory dies of the memory module and the first encoded data using a cyclic code encoding process. A cyclic code encoding process is a block code, where the circular shifts of each codeword gives another word that belongs to the code. Cyclic codes are error-correcting codes that have algebraic properties that are convenient for efficient error detection and correction. In one example, the cyclic code is Bose-Chaudhuri-Hocquenghem (BCH) code. BCH code forms a class of cyclic error-correcting codes that are constructed using polynomials over a finite field. One of the key features of BCH codes is that during code design, there is a precise control over the number of symbol errors correctable by the code. In particular, it is possible to design binary BCH codes that can correct multiple bit errors. Another advantage of BCH codes is the ease with which they can be decoded, namely, via an algebraic method known as syndrome decoding. This simplifies the design of the decoder for these codes, using small low-power electronic hardware. In another example, the cyclic code is Reed-Solomon (RS). Reed-Solomon codes operate on a block of data treated as a set of finite-field elements called symbols. Reed-Solomon codes are able to detect and correct multiple symbol errors. In another example, the cyclic code is CRC code. In this case by trading off the bit correction, more detection capability is obtained. In another example, the cyclic code is Hamming code. Hamming codes detect one-bit and two-bit errors or correct one-bit errors without detection of uncorrected errors. Hamming code involves generates a single-error correcting (SEC) code for any number of bits. The main idea is to choose the error-correcting bits such that the index-XOR (the XOR of all the bit positions containing a 1) is 0. Accordingly, it will be appreciated that various cyclic codes are possible within the scope of the present disclosure.

Figure 5:
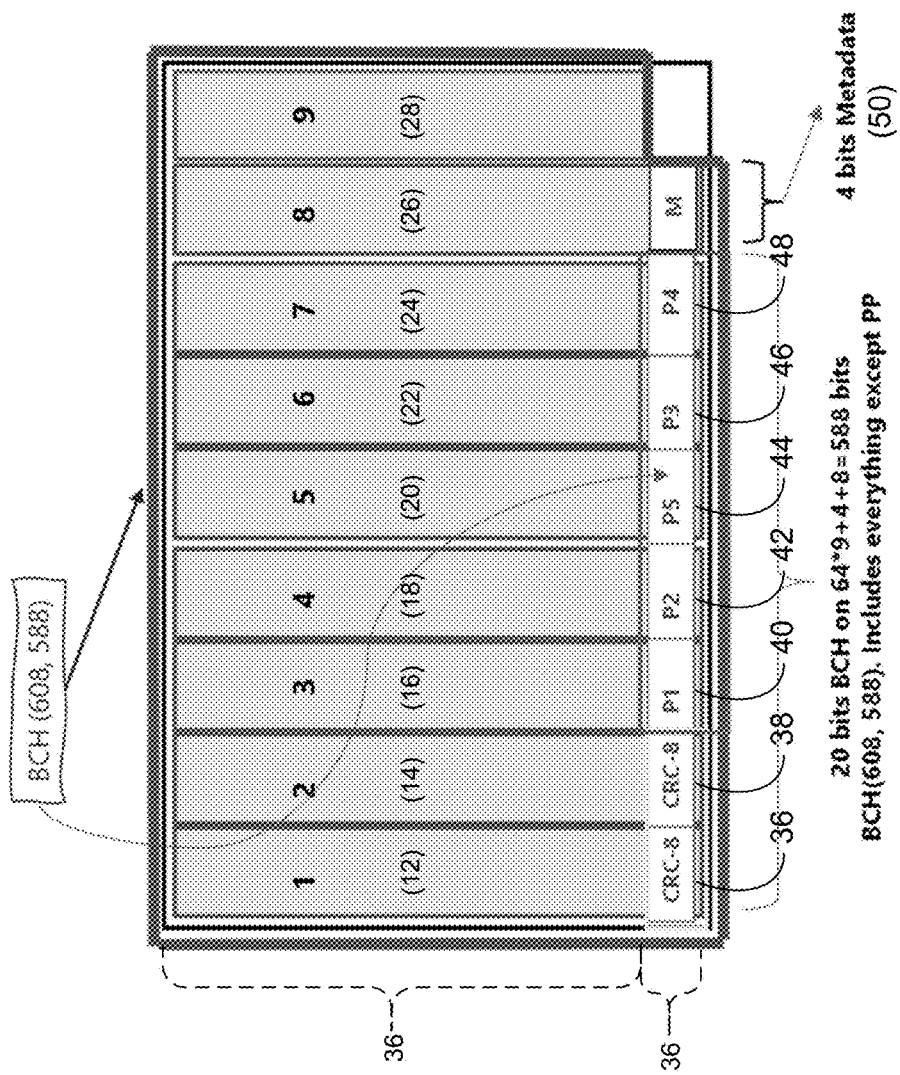

Referring also to FIG. 5 and continuing with the example configuration from FIGS. 3-4, data protection process 100 generates 104 second encoded data from dies 12, 14, 16, 18, 20, 22, 24, 26, 28 by generating 110 the second encoding of the data included within each of the plurality of memory dies of the memory module, the first encoded data, and the third encoded data using the cyclic code encoding process. In one example, data protection process 100 generates second encoded data by building a BCH on the bits of all dies (e.g., dies 12, 14, 16, 18, 20, 22, 24, 26, 28); third encoded data (e.g., bits 36, 38); metadata bits 50; and BCH parity bits (e.g., bits 40, 42, 44, 46, 48). In an example configuration of a DDR with a 9×2×2 configuration, BCH code (608, 588) provides error correction for 588 bits using twenty bits to form a total a length of 608 bits for the second encoded data. These bits (e.g., bits 40, 42, 44, 46, 48) represent second encoded data for the data in dies 12, 14, 16, 18, 20, 22, 24, 26, 28. In another example configuration of a DDR with a 5×4×2 or 5×8 configuration, BCH code (672, 652) provides error correction for 588 bits using twenty bits for the second encoded data.

Figure 6:
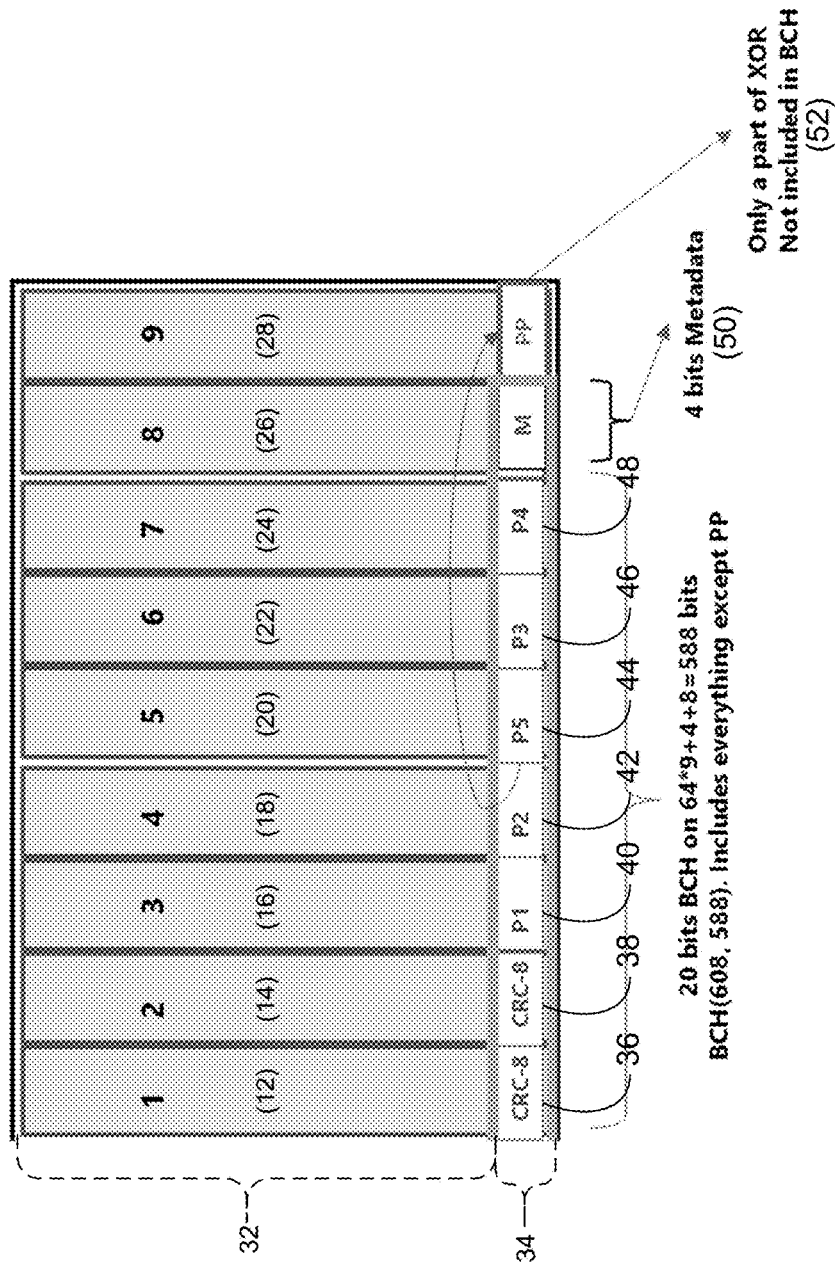

In some implementations and referring also to FIG. 6, data protection process 100 performs an encoding of the additional bits (e.g., bits 36, 38, 40, 42, 44, 46, 48, 50) to generate a parity for dies 12, 14, 16, 18, 20, 22, 24, 26, 28. In one example, data protection process 100 performs an XOR encoding process on the 32 bits (e.g., bits 36, 38, 40, 42, 44, 46, 48, 50 each including four bits) and storing the encoded result in bits 52. In some implementations, bits 52 represents bits that are not included in second encoded data as described above and as shown in FIG. 5.

Figure 7:
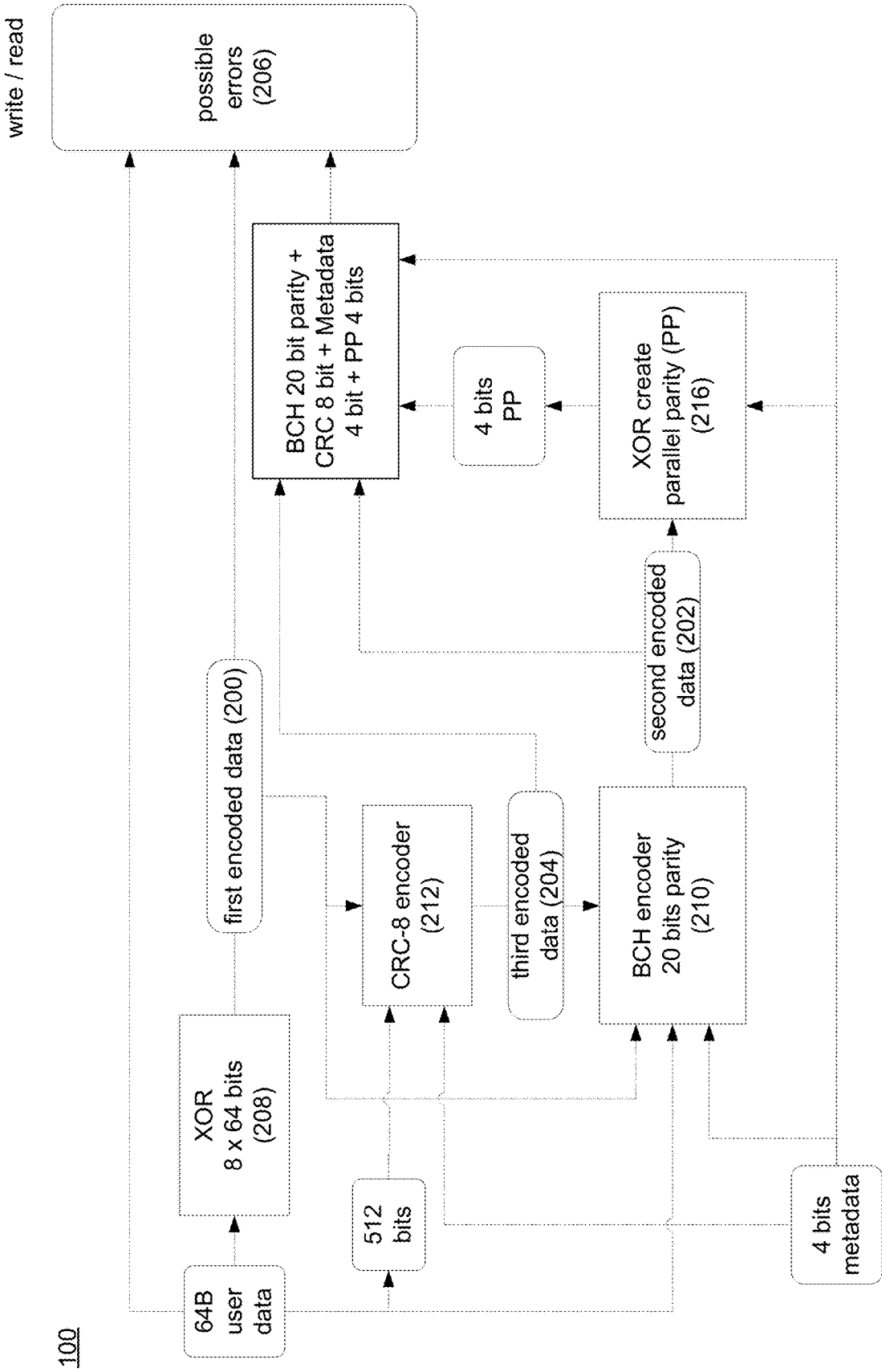

Referring also to FIG. 7, a flowchart of the encoding of data included within memory module 10 is shown. For example, data protection process 100 generates first encoded data (e.g., first encoded data 200); second encoded data (e.g., second encoded data 202); and third encoded data (e.g., third encoded data 204) included within the plurality of memory dies of the memory module. The encoded data (e.g., encoded data 206) is shown in FIG. 7 as a block. Data protection process 100 generates 102 first encoded data 200 by performing an XOR encoding process (e.g., XOR process 208). Data protection process 100 generates 104 second encoded data 202 by performing a cyclic code encoding process (e.g., using BCH encoder 210). Data protection process 100 generates third encoded data 204 by performing a cyclic redundancy check (CRC) process (e.g., using CRC-8 encoder 212). Data protection process 100 generates a parity (e.g., parity 214) by performing an XOR encoding process (e.g., using XOR process 216) on the second encoded data, the third encoded data, and the metadata.

Error Correction:

In some implementations, data protection process 100 performs 106 error correction on the data included within each of the plurality of memory dies of the memory module using the first encoded data, the second encoded data, an XOR decoding process, and a cyclic code error correction process. As will be discussed in greater detail below, performing 106 error correction on the data using the first encoded data, the second encoded data, an XOR decoding process, and a cyclic code error correction process supports resolving simultaneous chipkill and a single bit random error, or three single bit random errors. For example, data protection process 10 performs 106 anti-aliasing error correction on the data using a cyclic code error correction process by cyclically shifting an XOR mask to generate a rotated version of an aliased codeword to determine the aliased codeword from a correct codeword.

Figure 8:
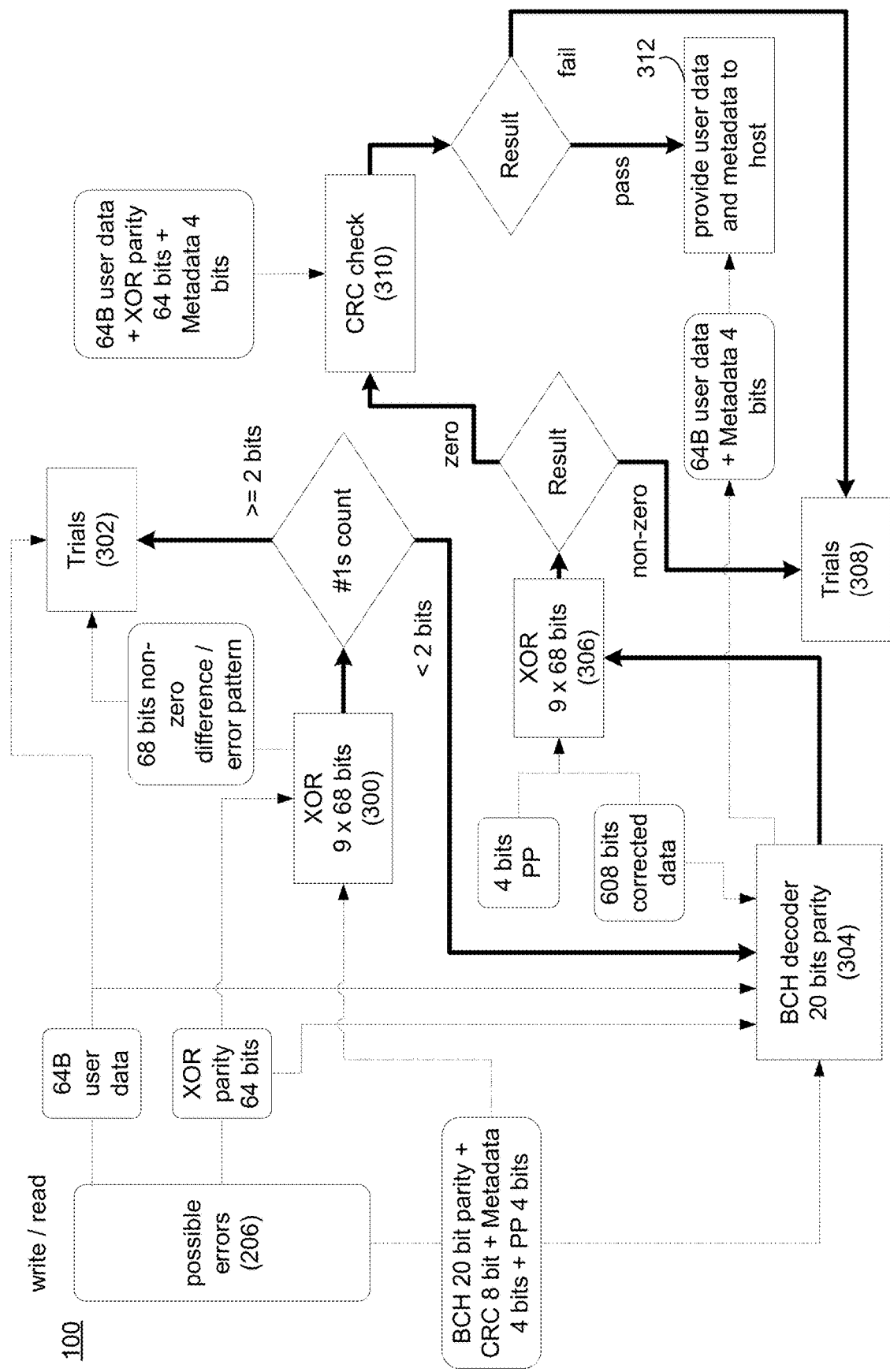

Referring also to FIG. 8, data protection process 100 performs 106 error correction on the data (e.g., data 200) by performing a combination of an XOR decoding process and a cyclic code error correction process. An XOR decoding process is the use of XOR processing to determine whether or not any bits have changed relative to the first encoded data (e.g., first encoded data 202). In one example, the XOR decoding process includes: generating 112 an XOR mask using the first encoded data; applying 114 the XOR mask to the data included within each of the plurality of memory dies; and determining 116 a number of bits in the XOR mask. As shown in FIG. 8, data protection process 100 provides first encoded data 202 to XOR process 300 to generate an XOR mask using the 64 bits of die 28. Data protection process 100 applies the XOR mask to the 576 bits from dies 12, 14, 16, 18, 20, 22, 24, 26 and determines a number of bits in the XOR mask. For example, if the number of bits in the XOR mask is determined to be two or more (e.g., where two is the number of BCH correction capability bits), data protection process 100 goes to "trials" as described in FIGS. 11-12. This is shown in FIG. 8 as trials 302. If the number of bits in the XOR mask is determined to less than two, data protection process 100 performs a cyclic code error correction process (e.g., represented in FIG. 8 using BCH decoder 304).

In some implementations, the cyclic code error correction process includes performing 118 BCH error correction in response to determining less than or equal to a number of BCH correction capability bits in the XOR mask during the XOR decoding process. A BCH correction capability bit represents the number of bots the BCH decoder can perform error correction on. In one example, the number of BCH correction capability bits is two. For example, when the number of bits in the mask is less than two (i.e., the number of BCH correction capability bits), data protection process 100 is able to perform error correction using cyclic code error correction. In one example, cyclic code error correction includes performing BCH error correction as shown in FIG. 8 using BCH decoder 304. In some implementations, performing 118 BCH error correction includes detecting an error by performing mathematical operations on the data to check for errors and correcting the data using parity bits within the BCH code (e.g., second encoded data 202). In response to performing BCH error correction using BCH decoder 304, data protection process 100 generates a new XOR mask using the corrected bits from BCH decoder 304 and the parity bits (e.g., parity 214) to determine a number of bits that are incorrect. BCH error correction applies mathematical algorithms to determine the correct values of the erroneous bits. For example and as will be discussed in greater detail below, cyclic code error correction can introduce mis-corrections to correct dies. Accordingly, data protection process 100 uses this new XOR mask to determine whether any mis-corrections are present in the result of BCH decoder 304.

In some implementations, the use of cyclic code error correction can introduce cyclic mis-corrections. Referring also to FIGS. 9A-10B, suppose a die (e.g., die 20) includes multiple errors. As such, the errors appear in the generated XOR (e.g., generated XOR 400). In the example of FIG. 9B, by performing an XOR decoding process on die 20 using generated XOR 400 results in a corrected die 20 (e.g., die 20'). However and referring also to FIG. 10A, by virtue of the cycle properties of cyclic code error correction, data protection process 100 introduces a mis-correction on die 24 (e.g., die 24'). Similarly in FIG. 10B, data protection process 100 introduces a mis-correction on die 16 (e.g., die 16'). In these examples, the error correction "aliases" onto dies 16 and 24. Accordingly, when BCH decoder 304 resolves any errors identified using the XOR mask, BCH decode 304 can introduce aliasing mis-corrections. As will be discussed in greater detail below, data protection process 100 performs additional XOR decoding processing and cyclic redundancy checks to address aliasing from cyclic code error correction. In some implementations, BCH decoder 304 is able to correct two bits anywhere in the 608 bits (i.e., all nine dies without the parity).

Referring again to FIG. 8, data protection process 100 generates a new XOR mask (with XOR process 306) using the results of BCH decoder 304 (e.g., 608 corrected bits) and the four parity bits to determine a number of non-zero bits. For example, if the number of bits in the resulting XOR mask application is "0" or that non-zero bits are only found in the parity, then the corrected bits are the same as the original bits from dies 12, 14, 16, 18, 20, 22, 24, 26. However, if the number of bits is non-zero, data protection process 100 performs "trials" as represented by trials 308. If the number of bits is zero or that there are only non-zero bits in the parity, data protection process 100 performs 120 a cyclic redundancy check decoding process as shown in FIG. 8 with action 31.

For example, a cyclic redundancy check decoding process generally includes performing polynomial division on the data with a generating polynomial where the remainder represents the redundancy or check value. In the example of FIG. 8, data protection process 100 performs 120 a cyclic redundancy check decoding process by using third encoded data 204 to determine whether the corrected data passes the cyclic redundancy check. In response to determining that the corrected data passes cyclic redundancy check, data protection process 100 passes the data to the host (e.g., action 312). However, if the corrected data fails the cyclic redundancy check, data protection process 100 performs "trials" as described in FIGS. 11-12.

Figure 11:
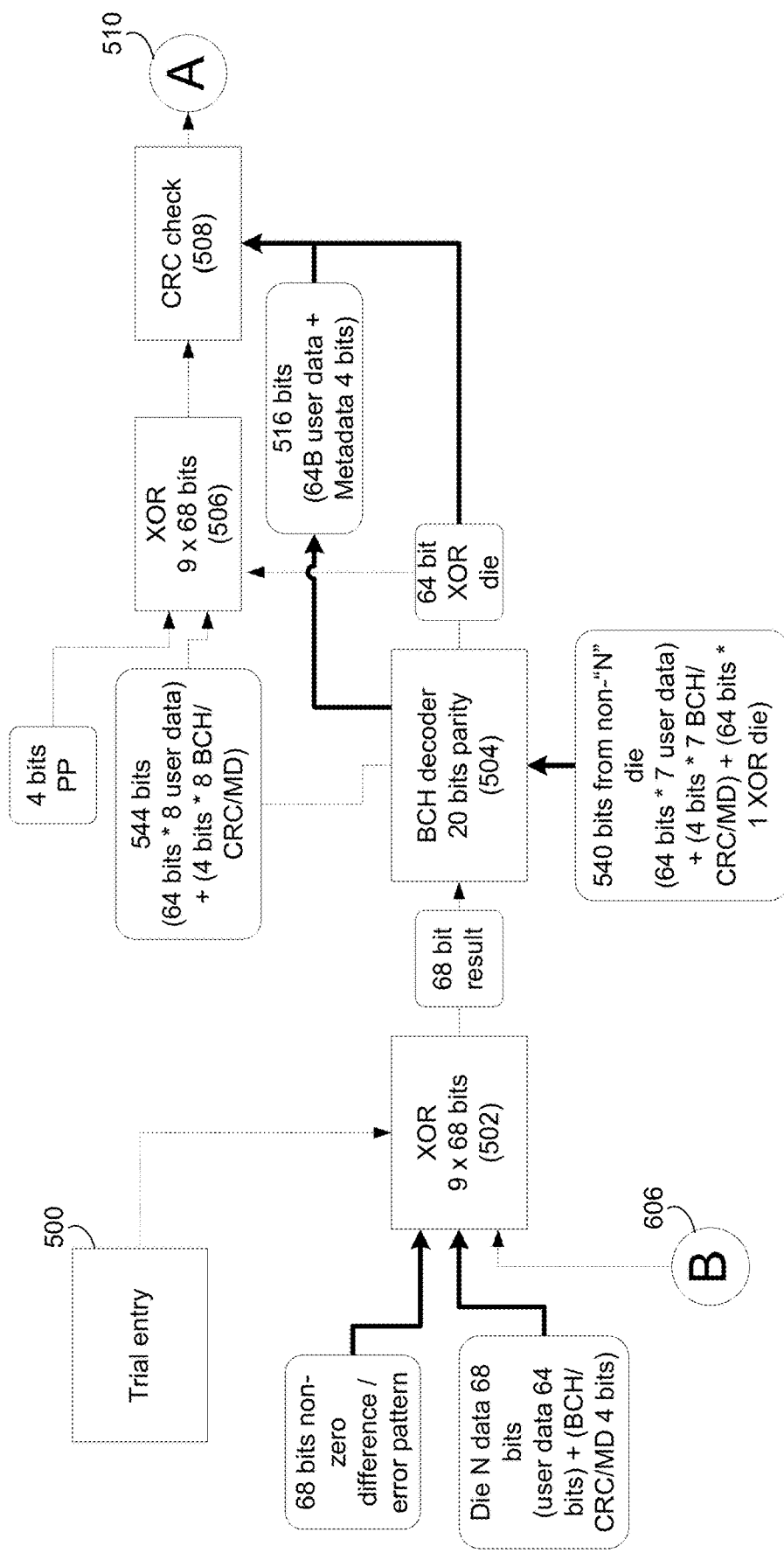
Figure 12:
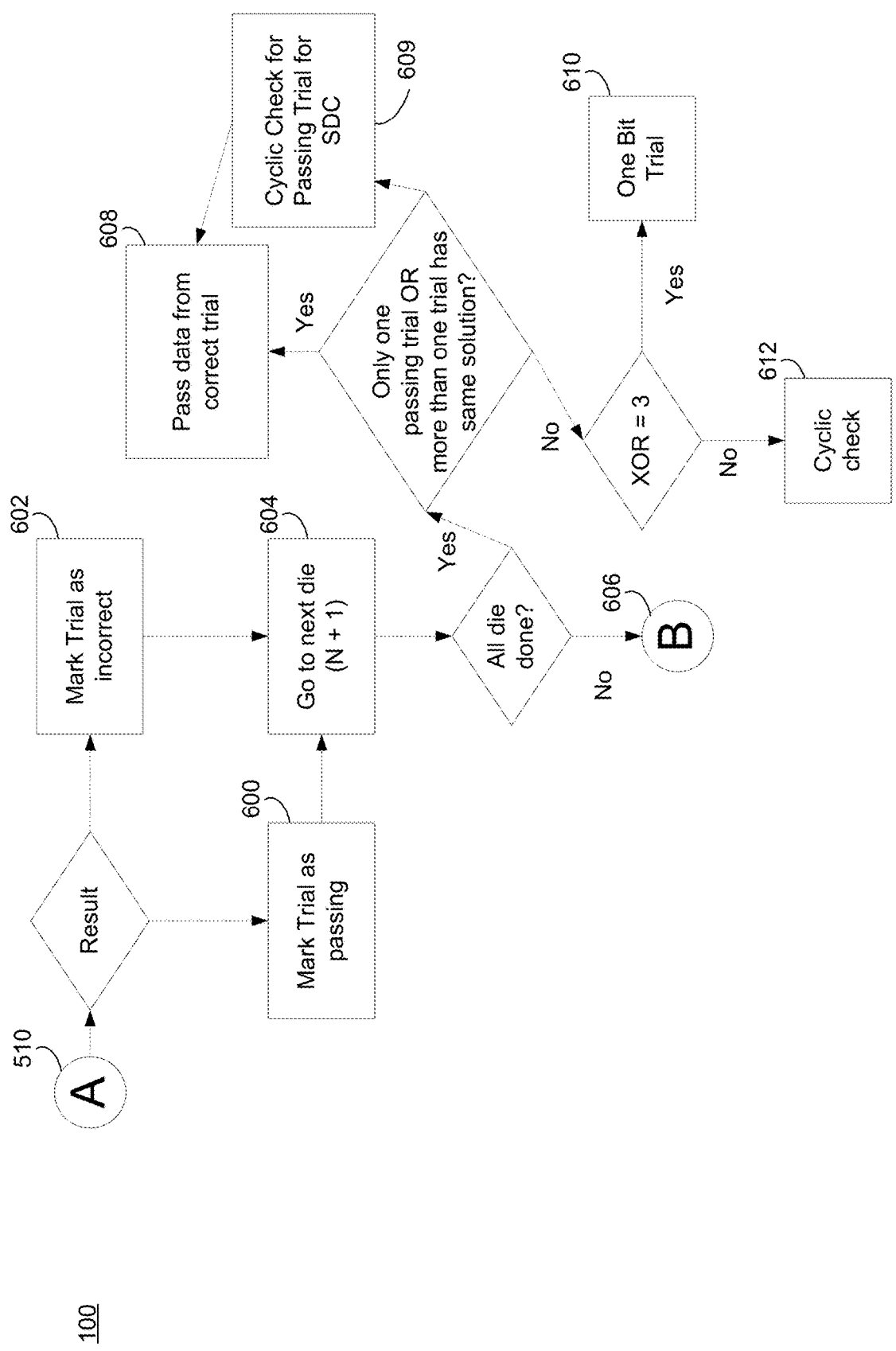

Referring also to FIG. 11, data protection process 100 begins a "trial" (represented by action 500) to resolve either a number of errors greater than two and/or aliasing mis-correction resulting from cyclic code error correction. Referring again to FIG. 11, data protection process 100 performs an XOR operation on each die with the error pattern (e.g., results of XOR process 300 in FIG. 8). Data protection process 100 provides the 68-bit result to BCH decoder 504 to perform BCH error correction. The results of BCH decoder 504 and the parity (e.g., parity 214) are used to generate a new XOR mask using XOR process 506. Data protection process 100 performs a cyclic redundancy check as shown in action 508. Process continues this process in FIG. 12 (e.g., by following action 510) where data protection process 100 determines whether the result passes the cyclic redundancy check. If so (e.g., action 600), data protection process 100 continues with the next die (e.g., action 602). If not (e.g., action 604), data protection process 100 continues with the next die (e.g., action 602) and records the number of failing or incorrect trials.

If there are additional dies to perform trials on, data protection process 100 follows action 606 to FIG. 11 to perform trials on the next die. If all of the dies have been tried, data protection process 100 determines whether multiple trials have the same solution. For example, the same data can occur when a single bit fails for two trials on dies with single bit random errors. If each trial has a unique solution, data protection process 100 continues with action 608. In some implementations and as an optional feature, data protection process 10 performs a cyclic check (as will be discussed in greater detail below) for the passing trial to check for silent data corruption (e.g., action 609). If the cyclic check is performed successfully, data protection process 10 continues with action 608 by passing data from the correct trial. If there are three "1's" in the XOR mask generated by action 506, data protection process 100 performs a one-bit trial as described in FIG. 13 by following action 610. If there are not three "1's" in the XOR mask generated by action 506, data protection process 100 performs a cyclic check by following action 612.

Figure 13:
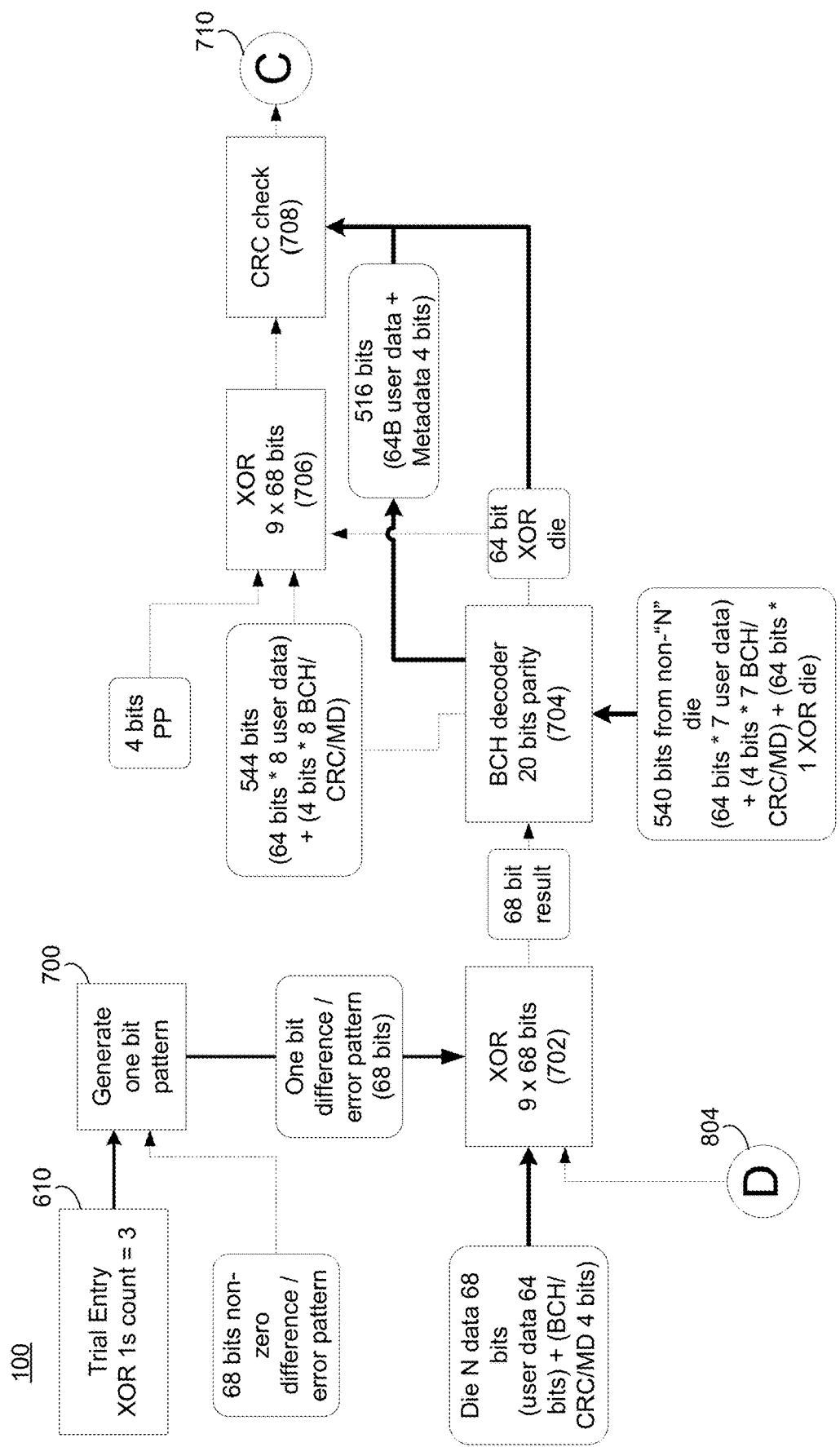
Figure 14:
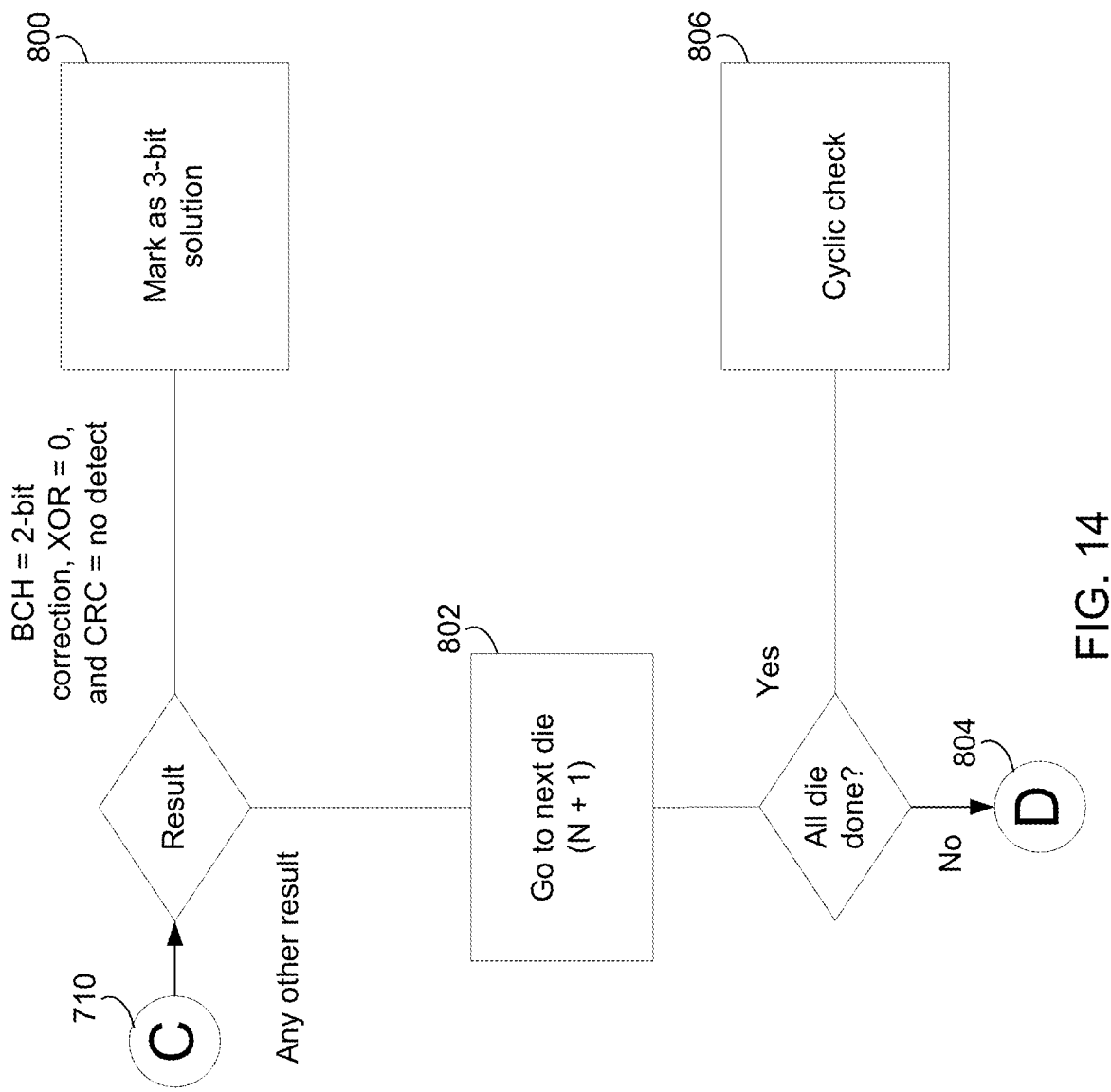

Referring also to FIG. 13, data protection process 100 performs a one-bit trial to allow for cyclic code error correction (e.g., BCH-20) with two-bit correction capability to correct three single bit errors on three separate dies. In some implementations and in response to determining that there are exactly three trials with the same solution, data protection process 100 generates a "one bit error pattern" (e.g., action 700) using the result of XOR process 300 from FIG. 8. For example, data protection process 100 generates a one-bit error pattern by removing two of the bits from the three bits associated with the three trials that had the same solution. Data protection process 100 performs an XOR operation (e.g., action 702) on each die separately with the one-bit error pattern (e.g., results of XOR process 300 in FIG. 8). Data protection process 100 performs a cyclic code error correction process (e.g., using BCH decoder 704). BCH decoder 704 is able to correct two bits anywhere in the 608 bits (i.e., all nine dies without the parity). In response to performing cyclic code error correction using BCH decoder 704, data protection process 100 generates a new XOR mask using the corrected bits from BCH decoder 704 and the parity bits (e.g., parity 214) and performs an XOR operation (e.g., action 706). As discussed above, cyclic code error correction can introduce mis-corrections. Accordingly, data protection process 100 provides the result of the XOR operation of action 706 to a cyclic redundancy check (e.g., at action 708) and proceeds to action 710 on FIG. 14 where data protection process 100 determines if the result indicates that cyclic code error correction performed a two bit correction (i.e., resolving the two bits not fixed by generating the one bit error pattern); the result of the XOR operation is "0"; and the cyclic redundancy check indicates that no cyclic errors have occurred. If so, data protection process 100 marks this configuration for this die as a solution (e.g., action 800). If not, data protection process 100 proceeds to test the next die (e.g., action 802). If there are additional dies to test, data protection process 100 returns to the trial shown in FIG. 13 via action 804. Otherwise, data protection process 100 performs a cyclic check (e.g., action 806).

Figure 15:
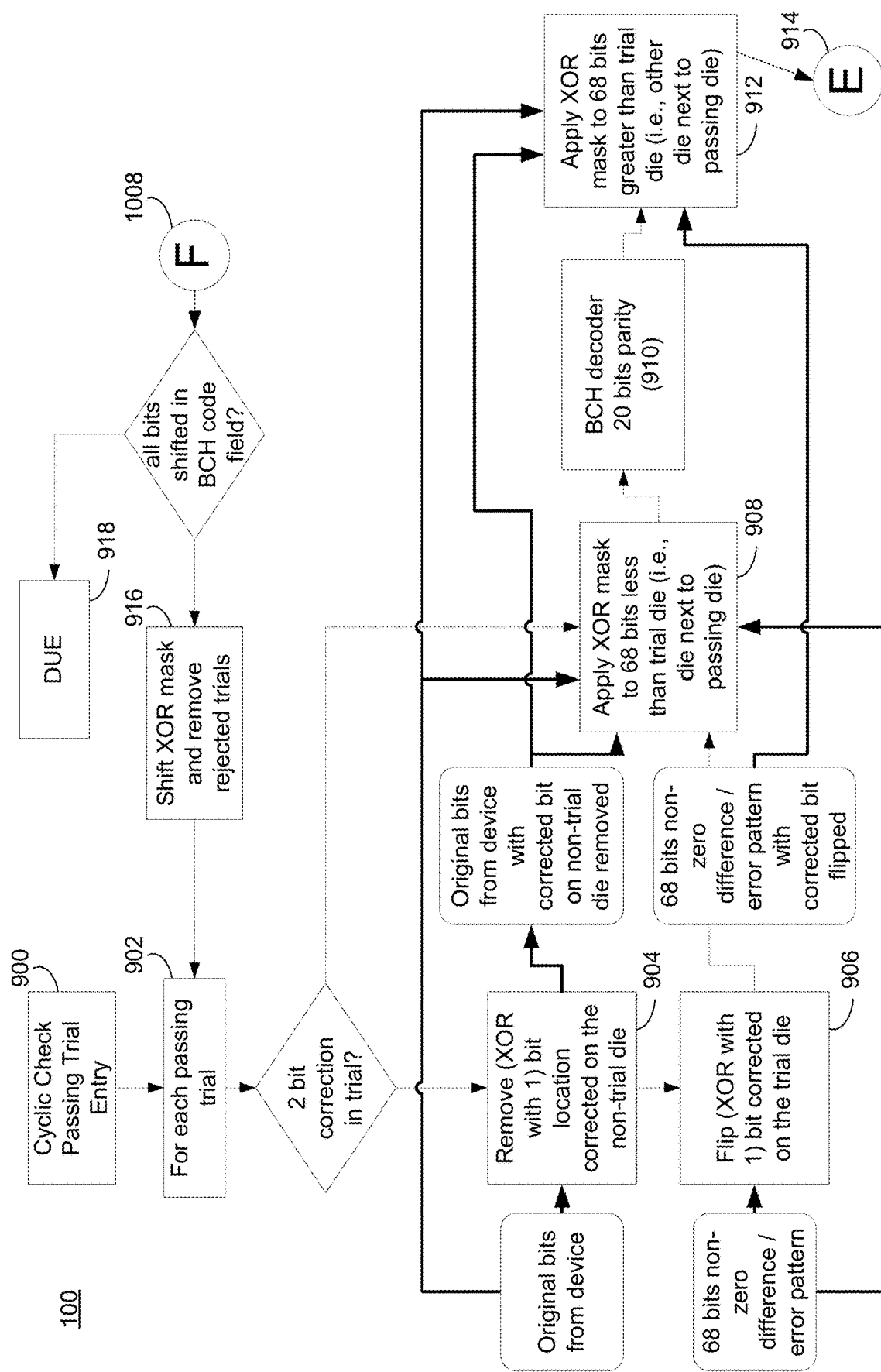

Referring also to FIG. 15, data protection process 100 performs a cyclic check (e.g., beginning at action 900) when there are multiple (i.e., two or more) "passing" and "in-scope" trials, where a passing trial is defined when: 1) the result of the XOR operation is "0"; cyclic code error correction performs a two bit correction (i.e., resolving the two bits not fixed by generating the one bit error pattern) or performs no correction; and the cyclic redundancy check indicates that no cyclic errors have occurred; or 2) when the result of the XOR operation is "1" within only a parity bit (e.g., parity 214); cyclic code error correction performs a one bit correction; and the cyclic redundancy check indicates that no cyclic errors have occurred. As discussed above, due to cyclic codes, a bit rotation of a valid codeword results in a valid codeword. As such, data protection process 100 performs cyclic check to remove invalid trials as a solution and to reduce the single, valid trial by rotating XOR mask around a suspected passing solution. In some implementations, the "sticky" bits from the failing die and the bits from the XOR mask on the invalid trial will rotate to another valid, aliased codeword.

To perform the cyclic check, data protection process 100 processes each passing trial (e.g., action 902) by selecting each other passing trial and for each other passing trial performing the following operations generally:

rotating the error pattern around the other passing trial die location;

checking cyclic code error correction (e.g., BCH) for valid codeword (i.e., same bits corrected); and if a valid codeword is identified, remove this trial as valid.

As shown in FIG. 15, in response to determining that there was a two-bit correction in the trial, data protection process 100 removes the bit location corrected on the non-trial die (e.g., action 904) to generate the original 608 bits from the dies but with the corrected bit on the non-trial die removed. Data protection process 100 takes the result of XOR process 300 (e.g., 68 bits generated as the XOR mask) and flips the bit corrected on the trial die (e.g., action 906). With the results of action 904 and action 906, data protection process 100 applies an XOR mask to the 68 bits less than the trial die (i.e., die next to the passing trial die) (e.g., action 908). Data protection process 100 performs a cyclic code error correction (e.g., using BCH decoder 910) to perform error correction on the results of the XOR mask applied in action 908. Data protection process 100 applies an XOR mask to the result of BCH decoder 910 at action 912 on the 68 bits greater than the trial die (i.e., the other die next to the passing trial die). Data protection process 100 continues as shown in FIG. 16 by following action 914.

Figure 16:
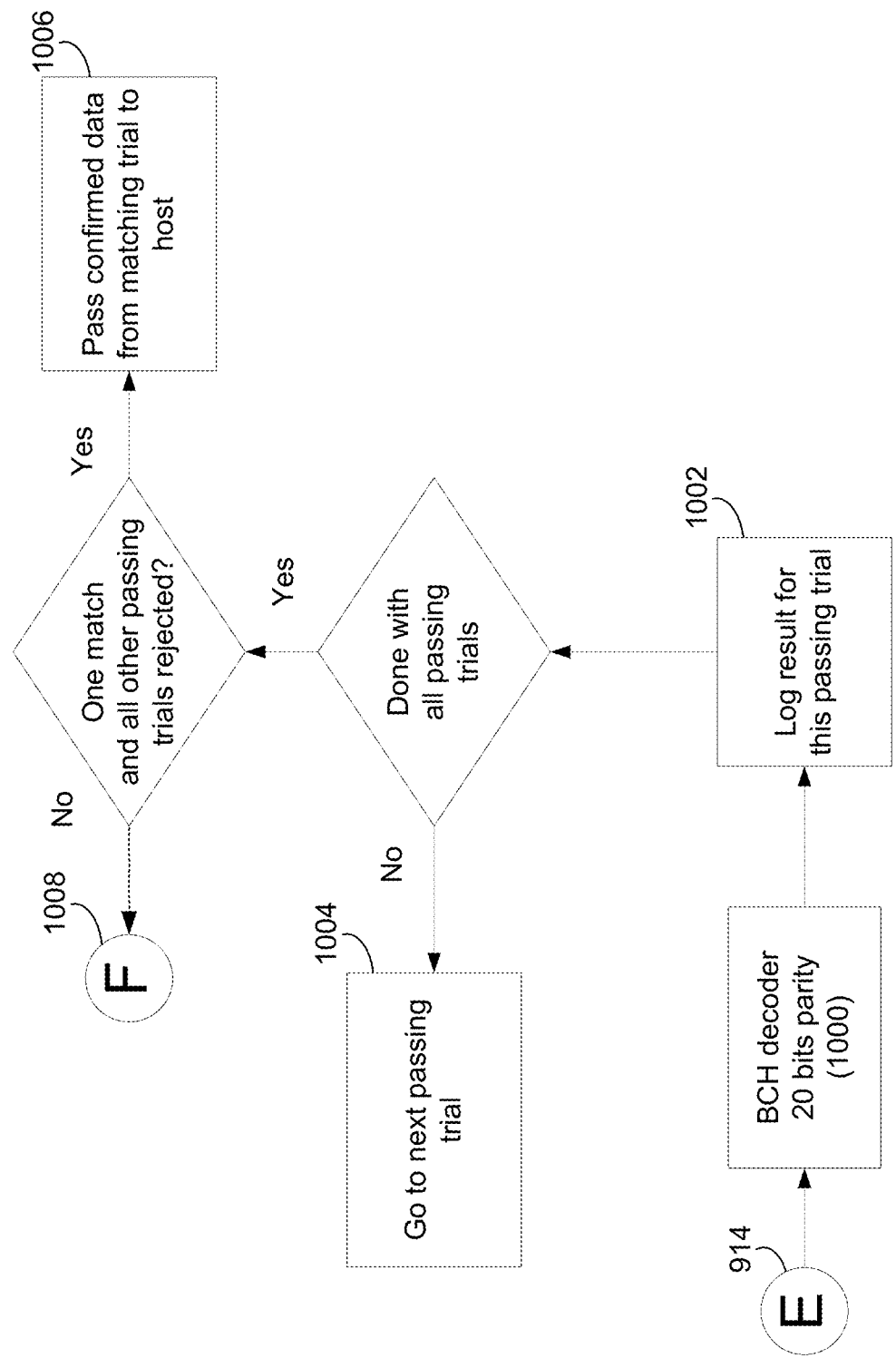

Referring also to FIG. 16, data protection process 100 processes the result of the XOR mask application in action 912 by performing cyclic code error correction (e.g., using BCH decoder 1000). The passing trial result is recorded (e.g., action 1002). Data protection process 100 repeats this process for each other passing trial until all other passing trials have been processed (e.g., repeat for next passing trial by following action 1004). This process is then repeated for each passing trial generally. For example, once all passing trials are processed, data protection process 100 determines whether one trial matches and all other passing trials are rejected. If so, data protection process 100 passes the confirmed data from the matching trial to a host for processing (e.g., action 1006). If not, data protection process 100 returns to FIG. 15 following action 1008.

Referring again to FIG. 15, data protection process 100 determines whether all bits are shifted in the BCH field code. If not, data protection process 100 shifts the XOR mask and removes the rejected trials from a pool of rejected trials and repeats at action 902 with the next passing trial. If all the bits are shifted in the BCH field code, data protection process 100 determines that memory module 10 has a detectable uncorrectable error (DUE) and informs the host that an error has been detected, but cannot be corrected (e.g., action 918). In some implementations, the result of the cycle check is that each invalid trial will have a valid rotated codeword, or that valid trials will have different solutions (i.e., where the "valid trial" aliases to a valid codeword).

Referring also to Table 1 below, there is shown including the results of each cyclic code error correction processing (e.g., using BCH decoder 910 in FIG. 15 and BCH decoder 1000 in FIG. 16) and the ultimate decision result for each cycle code error correction processing result (e.g., whether the trial is inconclusive, rejected, or a match).

TABLE 1

|  | BCH 1 (left) | BCH 2 (right) | Correction relative location | Decision |
|---|---|---|---|---|
| Result | Detect | Detect | N/A | Inconclusive |
|  |  | Correct 1 bit | N/A | Reject trial |
|  |  | Correct 2 bits | N/A | Reject trial |
|  |  | No detect | N/A | Reject trial |
|  | Correct 1 bit | Detect | N/A | Reject trial |
|  |  | Correct 1 bit | Same | Match |
|  |  | Correct 1 bit | Different | Inconclusive |
|  |  | Correct 2 bits | N/A | Reject trial |
|  |  | No detect | N/A | Reject trial |
|  | Correct 2 bits | Detect | N/A | Reject trial |
|  |  | Correct 1 bit | N/A | Reject trial |
|  |  | Correct 2 bits | Same (both) | Match |
|  |  | Correct 2 bits | Different | Inconclusive |
|  |  | No detect | N/A | Reject trial |
|  | No detect | Detect | N/A | Reject trial |
|  |  | Correct 1 bit | N/A | Reject trial |
|  |  | Correct 2 bits | N/A | Reject trial |
|  |  | No detect | N/A | Inconclusive |

Figure 17:
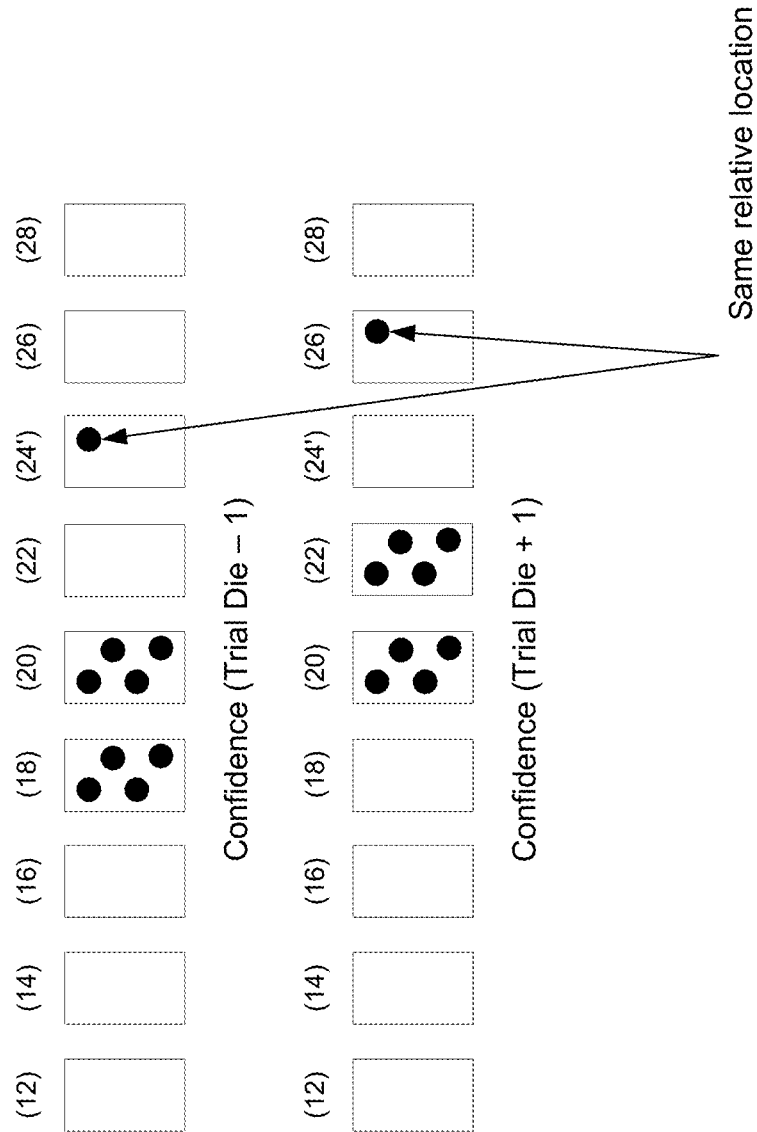

For example, if a result indicates that the passing trial should be rejected, data protection process 100 removes the die as a possible solution and continues to the next die. If the result indicates that the passing trial is inconclusive, data protection process 100 continues. If the result indicates that the passing trial is a match, then data protection process 100 uses the data from this trial as the correct data. As shown in Table 1, data protection process 100 matches the relative correction location to confirm that the trial is correct. The relative location is the same bit relative to the shifted mask. For example and referring also to FIG. 17, consider the example of nine dies where the same relative location is found in the seventh and eighth dies across multiple error corrections. In this example, because the relative location of the bit is the same in the shifted mask, this trial matches and is correct.

Figure 18:
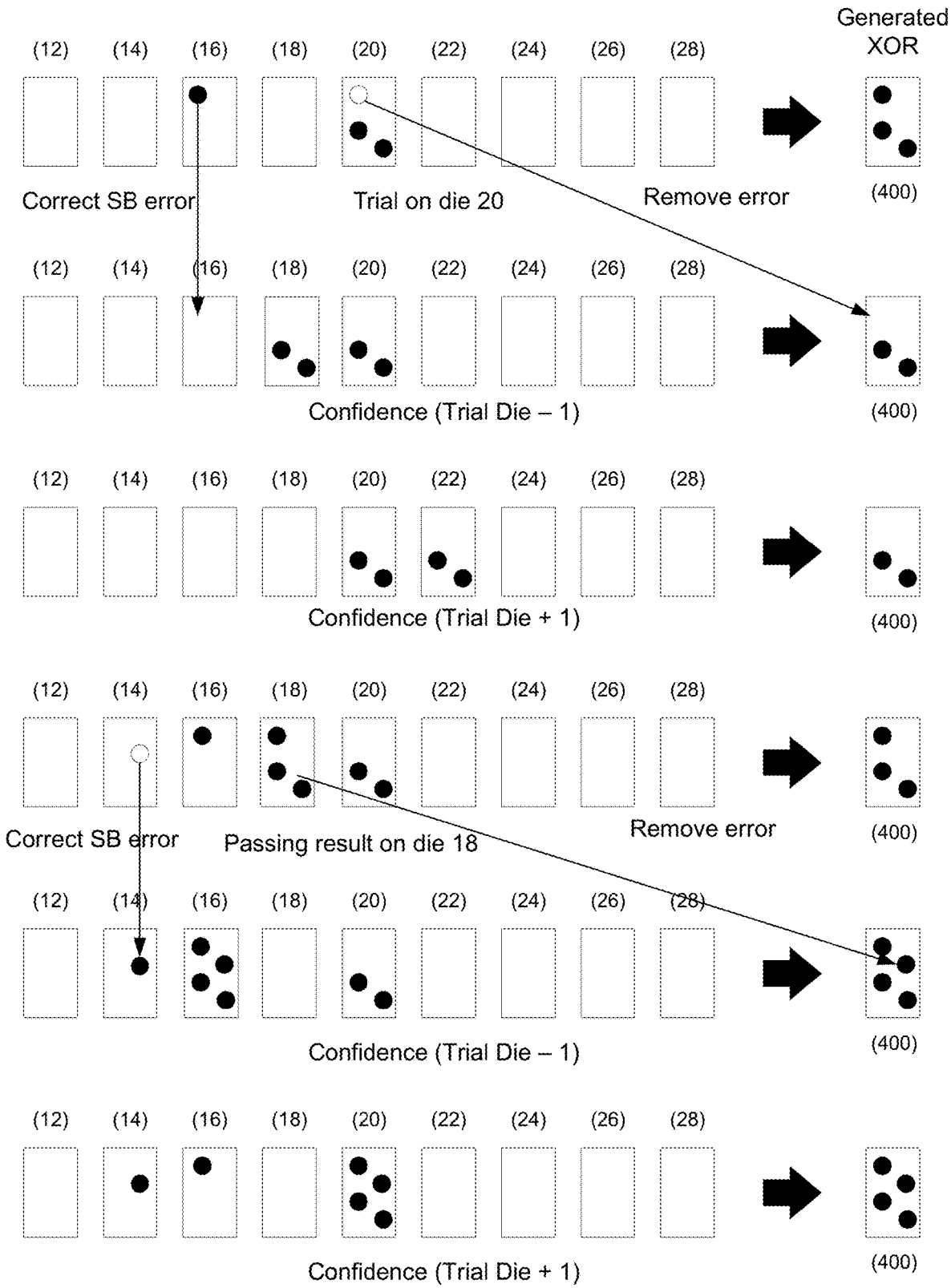

Referring also to FIG. 18, to gain confidence in a passing trial, data protection process 100 leverages circularity on a per-die basis. As discussed above in FIG. 16, data protection process 100 removes any other single bit random errors by flipping any single bit random errors not in the trial die and the corresponding bit in the generated XOR (e.g., first encoded data 202). Data protection process 100 generates a cyclic code error correction result for the modified XOR mask applied to the "trial die −1" (i.e., the die next to the passing trial die). This is shown in the second row of FIG. 18. Data protection process 100 generates a cyclic code error correction result for the modified XOR mask applied to the "trial die +1" (i.e., the other die next to the passing trial die). This is shown in the third row of FIG. 18. In this example, because the results in the second and third rows of FIG. 18 are identical, the confidence in the trial being a passing trial is improved. This process is repeated again in the fourth, fifth, and sixth rows with a different single bit random error being flipped. In this manner, data protection process 100 performs 106 anti-aliasing error correction on the data by cyclically shifting the XOR mask to generate a rotated version of an aliased codeword to determine the aliased codeword from a correct codeword.

System Overview:

In some implementations, data protection process 100 may be implemented as an entirely hardware embodiment, an entirely software embodiment (including firmware, resident software, micro-code, etc.) or an embodiment combining software and hardware aspects that are all generally be referred to herein as a "circuit," "module," "process," or "system."

The instruction sets and subroutines of data protection process 100, which is stored on storage device 54 coupled to DDR6 memory module 10, is executed by one or more processors (e.g., processor 56) and one or more memory architectures (e.g., memory architecture 58) included within DDR6 memory module 10. Examples of storage device 54 include: a random-access memory (RAM); a read-only memory (ROM); and all forms of flash memory storage devices.

General:

The present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module", "process" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
generating first encoded data by performing a first encoding of data included within each of a plurality of memory dies of a memory module using an exclusive-or (XOR) encoding process, wherein performing the first encoding comprises encoding a first bit of each memory die in a subset of the plurality of memory dies to generate a first bit of a memory die in the plurality of memory dies, wherein the memory die is not included in the subset of the plurality of memory dies;
generating second encoded data by performing a second encoding of the data included within each of the plurality of memory dies of the memory module and the first encoded data using a cyclic code encoding process; and
performing error correction on the data included within each of the plurality of memory dies of the memory module using the first encoded data, the second encoded data, an XOR decoding process, and a cyclic code error correction process.

2. The computer implemented method of claim 1 wherein the plurality of memory dies are configured in one or more of:
a 9×2×2 (DDR6) configuration;
a 9×4 (DDR5) configuration;
a 5×4×2 (DDR6) configuration;
a 5×8 (DDR5) configuration;
a 5×4×1 (DDR6) configuration;
a 10×2×2 (DDR6) configuration; and
a 10×4 (DDR5) configuration.

3. The computer implemented method of claim 1 further comprising:
generating third encoded data by performing a third encoding of the data included within each of the plurality of memory dies and the first encoded data using a cyclic redundancy check encoding process.

4. The computer implemented method of claim 3 wherein performing the second encoding of the data includes performing the second encoding of the data included within each of the plurality of memory dies of the memory module, the first encoded data, and the third encoded data using the cyclic code encoding process.

5. The computer implemented method of claim 1 wherein the XOR decoding process includes:
generating an XOR mask using the first encoded data;
applying the XOR mask to the data included within each of the plurality of memory dies; and
determining a number of bits in the XOR mask.

6. The computer implemented method of claim 5 wherein the cyclic code error correction process includes performing Bose-Chaudhuri-Hocquenghem (BCH) error correction in response to determining less than or equal to a number of BCH correction capability bits in the XOR mask during the XOR decoding process.

7. The computer implemented method of claim 1 wherein performing error correction on the data includes performing a cyclic redundancy check decoding process.

8. A computer program product residing on a computer readable medium having a plurality of instructions stored thereon which, when executed by a processor, cause the processor to perform operations comprising:
generating first encoded data by performing a first encoding of data included within each of a plurality of memory dies of a memory module using an exclusive-or (XOR) encoding process, wherein performing the first encoding comprises encoding a first bit of each memory die in a subset of the plurality of memory dies to generate a first bit of a memory die in the plurality of memory dies, wherein the memory die is not included in the subset of the plurality of memory dies;
generating second encoded data by performing a second encoding of the data included within each of the plurality of memory dies of the memory module and the first encoded data using a cyclic code encoding process; and
performing anti-aliasing error correction on the data included within each of the plurality of memory dies of the memory module using the first encoded data, the second encoded data, an XOR decoding process, and a cyclic code error correction process by cyclically shifting an XOR mask to generate a rotated version of an aliased codeword to determine the aliased codeword from a correct codeword.

9. The computer program product of claim 8 wherein the plurality of memory dies are configured in one or more of:
a 9×2×2 (DDR6) configuration;
a 9×4 (DDR5) configuration;
a 5×4×2 (DDR6) configuration;
a 5×8 (DDR5) configuration;
a 5×4×1 (DDR6) configuration;
a 10×2×2 (DDR6) configuration; and
a 10×4 (DDR5) configuration.

10. The computer program product of claim 8 further comprising:
generating third encoded data by performing a third encoding of the data included within each of the plurality of memory dies and the first encoded data using a cyclic redundancy check encoding process.

11. The computer program product of claim 10 wherein performing the second encoding of the data includes performing the second encoding of the data included within each of the plurality of memory dies of the memory module, the first encoded data, and the third encoded data using the cyclic code encoding process.

12. The computer program product of claim 8 wherein the XOR decoding process includes: generating the XOR mask using the first encoded data; applying the XOR mask to the data included within each of the plurality of memory dies; and determining a number of bits in the XOR mask.

13. The computer program product of claim 12 wherein the cyclic code error correction process includes performing BCH error correction in response to determining less than or equal to a number of Bose-Chaudhuri-Hocquenghem (BCH) correction capability bits in the XOR mask during the XOR decoding process.

14. The computer program product of claim 8 wherein performing error correction on the data includes performing a cyclic redundancy check decoding process.

15. A computing system including a processor and memory configured to perform operations comprising:
generating first encoded data by performing a first encoding of data included within each of a plurality of memory dies of a memory module using an exclusive-or (XOR) encoding process, wherein performing the first encoding comprises encoding a first bit of each memory die in a subset of the plurality of memory dies to generate a first bit of a memory die in the plurality of memory dies, wherein the memory die is not included in the subset of the plurality of memory dies;
generating second encoded data by performing a second encoding of the data included within each of the plurality of memory dies of the memory module and the first encoded data using a BCH encoding process; and
performing anti-aliasing error correction on the data included within each of the plurality of memory dies of the memory module using the first encoded data, the second encoded data, an XOR decoding process, and a Bose-Chaudhuri-Hocquenghem (BCH) decoding process by cyclically shifting an XOR mask to generate a rotated version of an aliased codeword to determine the aliased codeword from a correct codeword.

16. The computing system of claim 15 wherein the plurality of memory dies are configured in one or more of:
a 9×2×2 (DDR6) configuration;
a 9×4 (DDR5) configuration;
a 5×4×2 (DDR6) configuration;
a 5×8 (DDR5) configuration;
a 5×4×1 (DDR6) configuration;
a 10×2×2 (DDR6) configuration; and
a 10×4 (DDR5) configuration.

17. The computing system of claim 15 further comprising: performing a third encoding of the data included within each of the plurality of memory dies and the first encoded data using a cyclic redundancy check encoding process, thus defining third encoded data.

18. The computing system of claim 17 wherein performing the second encoding of the data includes performing the second encoding of the data included within each of the plurality of memory dies of the memory module, the first encoded data, and the third encoded data using a cyclic code encoding process.

19. The computing system of claim 15 wherein the XOR decoding process includes: generating the XOR mask using the first encoded data;
applying the XOR mask to the data included within each of the plurality of memory dies; and determining a number of bits in the XOR mask.

20. The computing system of claim 19 wherein a cyclic code error correction process includes performing Bose-Chaudhuri-Hocquenghem (BCH) error correction in response to determining less than or equal to a number of BCH correction capability bits in the XOR mask during the XOR decoding process.

\* \* \* \* \*